US007840939B1

(12) United States Patent
Chinnici

(10) Patent No.: US 7,840,939 B1
(45) Date of Patent: Nov. 23, 2010

(54) METHOD FOR MANAGING ANNOTATION INHERITANCE

(75) Inventor: Roberto R. Chinnici, Santa Clara, CA (US)

(73) Assignee: Oracle America, Inc., Redwood City, CA (US)

(*) Notice: Subject to any disclaimer, the term of this patent is extended or adjusted under 35 U.S.C. 154(b) by 1294 days.

(21) Appl. No.: 11/372,822

(22) Filed: Mar. 9, 2006

(51) Int. Cl.
*G06F 9/44* (2006.01)
(52) U.S. Cl. .................. 717/116; 717/117; 717/118
(58) Field of Classification Search .......... 717/108, 717/116, 117, 118
See application file for complete search history.

(56) References Cited

U.S. PATENT DOCUMENTS

| | | | | |
|---|---|---|---|---|
| 6,862,729 | B1* | 3/2005 | Kuch et al. | 717/158 |
| 2005/0240863 | A1* | 10/2005 | Olander et al. | 715/513 |
| 2005/0262091 | A1* | 11/2005 | Marvin et al. | 707/10 |
| 2005/0262499 | A1* | 11/2005 | Read | 717/172 |
| 2006/0225053 | A1* | 10/2006 | Lakshman et al. | 717/140 |
| 2006/0277456 | A1* | 12/2006 | Biberstein et al. | 715/512 |

OTHER PUBLICATIONS

"The AspectJTM 5 Development Kit Developer's Notebook", Chapter 2. "Annotations", Dec. 24, 2005, By Eclipse Foundation, AspectJ Team.*
"Tutorial 7—Inheritance & Polymorphism", Feb. 4, 2005, pp. 1-5.*
"Tutorial 10—Advanced Swing", Feb. 9, 2005, pp. 1-6.*
Hunter, "Making the Most of Java's Metadata", Mar. 31, 2005, Oracle, Technology Network, pp. 1-9.*
JAVA Tutorial, "Inheritance", Oct. 11, 2007, http://download-llnw.oracle.com/javase/tutorial/java/landI/subclasses.html, pp. 1-6.*
Burke, "Aspect-Oriented Annotations", Mar. 2, 2005, O'Rielly ONJava.com, pp. 1-11.*
Christy, "Annotation in JAVA 5.0", Aug. 11, 2007, http://web.archive.org/web/20080625032338/http://www.javabeat.net/articles/30-annotations-in-java-50-1.html, www.javabeat.net, pp. 1-14.*
"A single member annotation", Demo Source and Support, May 4, 2006, http://web.archive.org/web/20060504215008/http://www.java2s.com/Code/Java/Language-Basics/Asinglememberannotation.htm, pp. 1-3.*
Greg Lavender, "Inheritance in JAVA", Jun. 15, 1999, http://userweb.cs.utexas.edu/users/lavender/courses/tutorial/java-06.pdf, pp. 1-12.*

(Continued)

*Primary Examiner*—Wei Y Zhen
*Assistant Examiner*—Chih-Ching Chow
(74) *Attorney, Agent, or Firm*—Martine Penilla & Gencarella, LLP

(57) ABSTRACT

Rules are provided to address the interplay of annotations and inheritance in the JAVA programming language. Class-level annotations affect the class they annotate and members of the class they annotate. Class-level annotations do not affect a class member declared by a superclass. If a class member carries a specific member-level annotation, an annotation of the same type implied by a class-level annotation is ignored. An interface implemented by a class does not contribute annotations to the implementing class or members of the implementing class. Class members inherited from a superclass, that are neither hidden nor overridden, maintain the annotations they had in the class that declared them. Member-level annotations on class members inherited from a superclass, that are either hidden or overridden, are ignored. Interface-level annotations affect the interface they annotate and all members of the interface they annotate, including inherited members.

18 Claims, 7 Drawing Sheets

OTHER PUBLICATIONS

Gaijc, "Introduction to Class Inheritance (Delphi OOP Tutorial) Chapter 5", Dec. 31, 2006, http://web.archive.org/web/20061231060119/http://delphi.about.com/od/oopindelphi/a/delphi_oop5_3.htm, pp. 1-3.*

"The AspectJTM 5 Development Kit Developers Notebook", Chapter 2. "Annotations, Using Annotations with declare statements", Dec. 24, 2005, pp. 1-2, By Eclipse Foundation, AspectJ Team.*

* cited by examiner

METHOD FOR MANAGING ANNOTATION INHERITANCE

BACKGROUND

An annotation type was introduced in the JAVA 2 Standard Edition (J2SE), release 5.0. The annotation type represents a declaration type that can be inherited down through a class hierarchy. The interplay of annotations and inheritance in the JAVA language represents a potential source of complexity for application developers. For example, given that annotations are a new feature in the JAVA language, application developers will be relying on some implicit assumptions regarding how annotations compose with other features of the JAVA language. Additionally, because annotation semantics can be defined by individual specifications, a potential exists for inconsistencies in how inheritance is implemented with respect annotations within the class hierarchy.

Some preliminary approaches to managing annotation inheritance are based on false analogies. For example, one preliminary approach states that an annotation should behave like a modifier with respect to inheritance. Another preliminary approach states that management of annotation inheritance should be accomplished only through use of the @Inherited meta-annotation. Use of the preliminary approaches to managing annotation inheritance, particular the ones identified above, results in semantics that are essentially unmanageable when considering use of annotations in more advanced JAVA programs. More specifically, annotation inheritance can become quite complex in JAVA programs that use a combination of inheritance and methods that are overloaded, overridden, or hidden.

SUMMARY

In one embodiment, a computer readable medium is disclosed as having instructions encoded thereon for implementing a method for managing annotation inheritance in an object-oriented program. The method includes an operation for identifying a class-level annotation applied to modify a class. The identified class-level annotation is associated with each member declared within the class. The method also includes identifying a member-level annotation applied to modify a member declared within the class. The identified member-level annotation is associated with the member to which the member-level annotation is applied. If the member-level annotation and the class-level annotation are of a common type, the member-level annotation is considered to supercede the class-level annotation having been implicitly associated with member.

In another embodiment, a computer system is disclosed for managing annotation inheritance in an object-oriented program. The computer system includes a bus, a memory, a display, and a processor. The processor is defined to be communication with the memory and the display through the bus. The processor is operable to receive instructions which, when executed by the processor, cause the processor to perform a method for managing annotation inheritance in an object-oriented program. The method includes an operation for identifying a class-level annotation applied to modify a class. The identified class-level annotation is associated with each member declared within the class. The method also includes identifying a member-level annotation applied to modify a member declared within the class. The identified member-level annotation is associated with the member to which the member-level annotation is applied. If the member-level annotation and the class-level annotation are of a common type, the member-level annotation is considered to supercede the class-level annotation having been implicitly associated with member.

In another embodiment, a computer readable medium is disclosed as having instructions encoded thereon for providing a graphical user interface (GUI) for developing an object-oriented program. The instructions cause object-oriented program source code to be rendered in a text form in a display. The instructions also determine which annotations are associated with classes and class members within the source code in accordance with a method for managing annotation inheritance. The instructions further cause explicit annotation associations to be rendered in a text form consistent with rendering of non-annotation source code. Also, the instructions cause implicit annotation associations to be rendered in a modified text form different from the text form used to render non-annotation source code.

Other aspects of the invention will become apparent from the following detailed description, taken in conjunction with the accompanying drawings, illustrating by way of example the principles of the invention.

DETAILED DESCRIPTION

Figure 1:
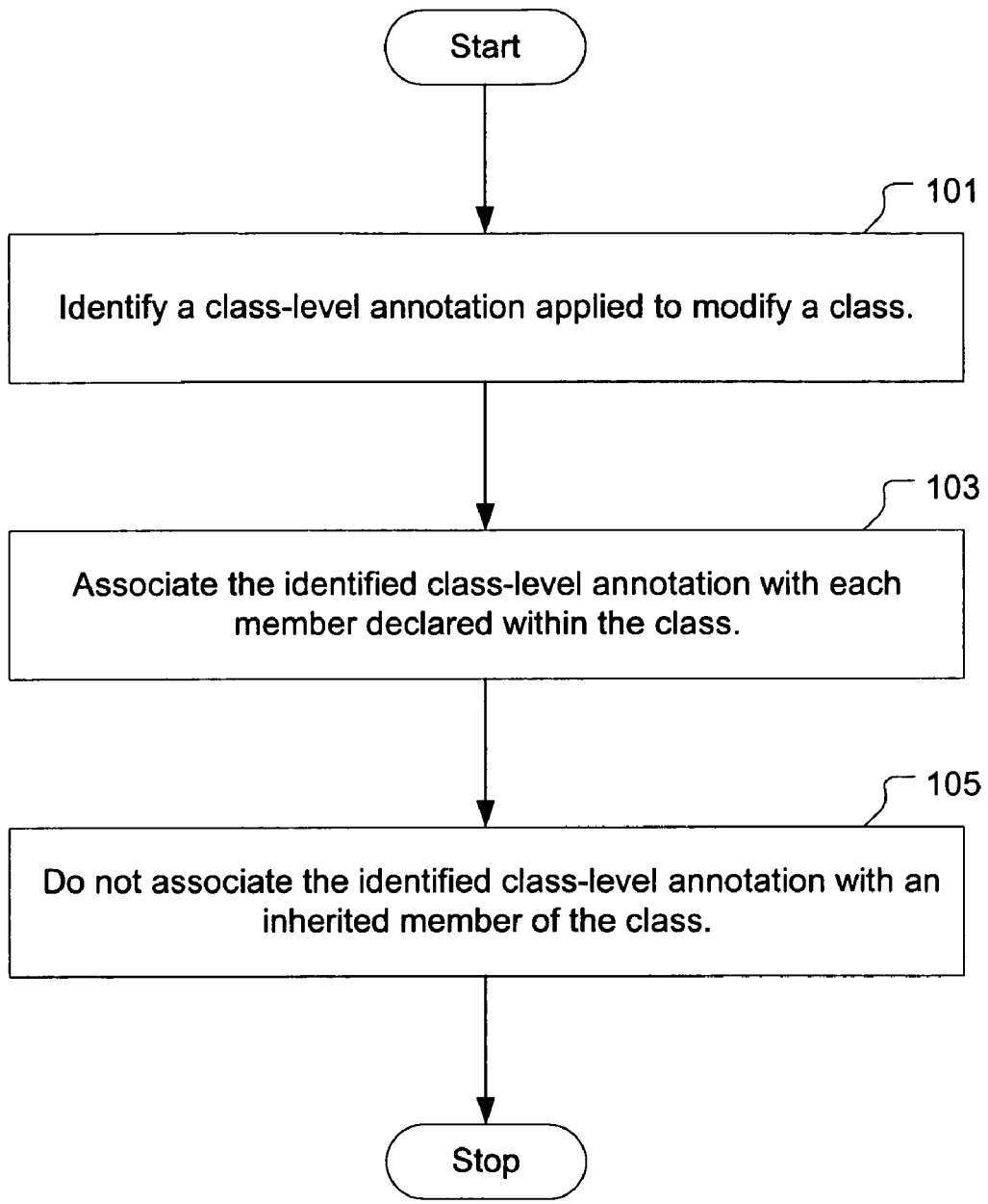
FIG. 1 is an illustration showing a flowchart of a method for managing class-level annotation inheritance, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

The present invention is described in the context of JAVA technology, including the JAVA programming language and the JAVA platform. More specifically, the present invention is primarily described with respect to the JAVA 2 Standard Edition (J2SE) programming language and platform that provides annotation capability. However, it should be understood that the present invention applies to any JAVA release or other object-oriented programming language that provides an annotation capability.

In the JAVA programming language, source code is written in plain text source files according to the JAVA language specification. The JAVA source code files are then compiled into bytecode files by the JAVA compiler. Bytecode is not native to a particular processor, rather bytecode is the machine language for the JAVA Virtual Machine (JVM). Once the JAVA source code of an application is compiled into bytecode, the application can be run using the JAVA launcher tool within an instance of the JVM.

A platform represents the hardware or software environment in which a program runs. Most platforms are represented by an operating system and underlying hardware on which the operating system runs. The JAVA platform is a software-only platform that runs on top of other hardware-based platforms. The JAVA platform includes the JVM and the JAVA Application Programming Interface (API). The JVM is the base of the JAVA platform and can be installed and executed on various hardware-based platforms. The JAVA API is a large collection of ready-made software components that are grouped into libraries of related classes and interfaces. The JAVA API provides the core functionality of the JAVA programming language. It offers a wide array of useful classes ready for use in developed applications. A complete description of the JVM and JAVA API is not required for understanding of the present invention. Furthermore, one skilled in the art is expected to have an understanding the JVM and JAVA programming language. Nevertheless, to ensure understanding of the present invention, a brief description of inheritance and annotation types within the J2SE programming language is provided below.

In object-oriented programming, such as with the J2SE programming language, objects are defined in terms of classes. Also, classes can be defined in terms of other classes. A subclass is a class that is derived from a particular class, perhaps with one or more classes in between. A superclass is a class from which a particular class is derived, perhaps with one or more classes in between. Inheritance in the concept of classes automatically containing the variables and methods defined in their supertypes, wherein supertypes of a particular type include all interfaces and classes that are extended or implemented by the particular type. Inheritance is not limited to a single layer of inheritance. An inheritance tree, or class hierarchy, can be as deep as needed. Methods and variables are inherited down through the levels of the inheritance tree. Classes appearing farther down in the class hierarchy will generally have more specialized behavior. For example, in J2SE, the "Object" class defines and implements behavior common to all objects. The "Object" class is at the top of the class hierarchy, and each class is its descendant, either directly or indirectly. Thus, the "Object" class is the most general of all classes and provides behaviors that are shared by all objects running in the JVM.

Each subclass inherits state and methods from its superclass, wherein the state can be in the form of variable declarations. However, subclasses are not limited to the states and behaviors provided to them by their superclass. Subclasses can add variables and methods to the ones inherited from the superclass. Subclasses can also override inherited methods and provide specialized implementations for those methods. While a subclass inherits all the member variables and methods from its superclass, the subclass may not have access to an inherited member variable or method. For example, a subclass cannot access a private member inherited from its superclass. Although the private member cannot be accessed by the subclass, the private member is still inherited by the subclass and available for further inheritance by a descendant of the subclass. For example, an inner class inherits members of its enclosing class and may have access to inherited members that are private to its enclosing class.

An annotation type, as introduced in J2SE release 5.0, represents a declaration type that can be inherited down through the class hierarchy. The present invention provides a method for managing inheritance of annotation types in JAVA. However, before proceeding with description of the method for managing inheritance of annotation types, a brief description of the annotation facility and some example annotation types is provided.

Through a general purpose annotation facility, a programmer can define and use custom annotation types. The general purpose annotation facility includes a syntax for declaring annotation types, a syntax for annotating declarations, APIs for reading annotations, a class file representation for annotations, and an annotation processing tool.

Annotations do not directly affect program semantics, but they do affect the way programs are treated by tools and libraries, which can in turn affect the semantics of the running program. Annotations can be read from source files, class files, or reflectively at run time. Annotation type declarations are similar to normal interface declarations. An at-sign (@) precedes the "interface" keyword. Each method declaration defines an element of the annotation type. Method declarations cannot have any parameters or a "throws" clause. Also, return types are restricted to primitives, "String", "Class", enums, annotations, and arrays of the preceding types. Additionally, methods can have default values.

Once an annotation type is defined, the annotation type can be used to annotate declarations. An annotation is a special type of modifier, and can be used anywhere that other modifiers (such as "public", "static", or "final") can be used. By convention, annotations precede other modifiers. Annotations include an at-sign (@) followed by an annotation type and a parenthesized list of element-value pairs. The values should be compile-time constants. The following is an example of an annotation type declaration:

```
public @interface RequestForEnhancement {
    int id( );
    String synopsis( );
    Stringengineer( )    default "[unassigned]";
    Stringdata( );       default "[unimplemented]";
}
```

The following is a method declaration with an annotation corresponding to the annotation type declaration shown above:

```
@RequestForEnhancement (
    id          = 2868724,
    synopsis    = "Enable time-travel",
    engineer    = "Mr. Peabody",
    date        = "4/1/3007"
)
public static void travelThroughTime(Date destination) { ... }
```

An annotation with no elements is termed a marker annotation type. The following is an example of a marker annotation type:

```
public @interface Preliminary{ }
```

It is possible to omit the parentheses in marker annotations as shown below:

```
@Preliminary public class TimeTravel { ... }
```

In annotations with a single element, the element should be named "value", as shown below:

```
public @interface Copyright {
    String value( );
}
```

It is permissible to omit the element name and equals sign (=) in a single-element annotation whose element name is "value", as shown below:

```
@Copyright("2002 Yoyodyne Propulsion Systems")
public class OscillationOverthruster { ... }
```

Additionally, the annotation type declaration itself can be annotated. Such annotations are called meta-annotations. For example, the meta-annotation (@Retention (RetentionPolicy.RUNTIME)) indicates that annotations of the type associated with this meta-annotation are to be retained by the JVM so they can be read reflectively at run-time. In another example, the meta-annotation (@Target(ElementType.METHOD)) indicates that annotations of the type associated with this meta-annotation can be used to annotate only method declarations. It should be appreciated that the above description of annotation type declarations, annotations, and meta-annotations is provided for exemplary purposes and does not represent an exhaustive description.

Given the above description of inheritance and the annotation facility in JAVA, attention is now directed to inheritance of annotations. The interplay of annotations and inheritance in the JAVA language represents a potential source of complexity for application developers. For example, given that annotations are a new feature in the JAVA language, application developers will be relying on some implicit assumptions regarding how annotations compose with other features of the JAVA language. Additionally, because annotation semantics can be defined by individual specifications, a potential exists for inconsistencies in how inheritance is implemented with respect to annotations within the class hierarchy.

Some preliminary approaches to managing annotation inheritance are based on false analogies. For example, one preliminary approach states that an annotation should behave like a modifier with respect to inheritance. Another preliminary approach states that management of annotation inheritance should be accomplished only through use of the @Inherited meta-annotation. Use of the preliminary approaches to managing annotation inheritance, particular the ones identified above, results in semantics that are essentially unmanageable when considering use of annotations in more advanced JAVA programs. More specifically, annotation inheritance can become quite complex in JAVA programs that use a combination of inheritance and methods that are overloaded, overridden, or hidden. In contrast to the preliminary approaches for managing annotation inheritance, the present invention provides a method for managing annotation inheritance that controls the complexity associated with use of annotations in JAVA programs that combine inheritance with methods that are overloaded, overridden, or hidden.

The method of the present invention defines and applies a minimal set of rules for determining which annotations are relevant in the presence of inheritance. These rules are defined to govern the interaction of annotations and inheritance. In accordance with the present invention, the rules for managing annotation inheritance are summarized as follows:

Rule 1: Class-level annotations only affect the class they annotate and their members, i.e., fields and methods. Class-level annotations never affect a member declared by a superclass, even if the member is neither hidden nor overridden by the class in question. Rule 1 is exemplified in the following code snippet:

```
public class B {
    public void mB( ) { ... }
}
@Foo public class A extends B {
    public void mA1( ) { ... }
    public void mA2( ) { ... }
}
```

Assuming that the @Foo annotation on class A has an effect on the members of an annotated class, e.g., methods mA1 and mA2, Rule 1 states that the @Foo annotation on class A cannot affect class B or method mB as declared on class B, wherein class B is the superclass of class A.

Rule 2: In addition to affecting the annotated class, class-level annotations may act as a shorthand for member-level annotations. However, if a member carries a specific member-level annotation, any annotation of the same type implied by a class-level annotation is ignored. In other words, explicit member-level annotations have priority over a member-level annotation implied by a class-level annotation. Rule 2 is exemplified in the following code snippet:

```
@TxAttribute(OPTIONAL)
public class A {
    public void m1( ) ( ... )
    @TxAttribute(REQUIRED) public void m2( ) { ... }
)
```

According to Rule 2, the @TxAttribute (transaction attribute) annotation on class A may affect methods defined in class A, such as method m1. In this example, method m1 would be considered to have an implicit transaction attribute with the value of OPTIONAL. Furthermore, since method m2 is itself annotated with a @TxAttribute annotation, in determining the effective transaction attribute for method m2, the class-level annotation @TxAttribute(OPTIONAL) must be ignored. Consequently, the transaction attribute of method m2 will have a value of REQUIRED.

Rule 3: The interfaces implemented by a class never contribute annotations to the class itself or any members of the class. Rule 3 is exemplified in the following code snippet:

```
@Foo(THIS)
public interface I {
    public void m1( );
}
@Foo(THAT)
public class A implement I {
```

```
    public void m1( ) { ... }
    public void m2( ) { ... }
}
```

According to Rule 3, the annotation on interface I is ignored when determining which annotations are applicable to class A and its members, e.g., method m1 and method m2. Thus, class A, method m1, and method m2 are only affected by the @Foo(THAT) annotation on class A.

Rule 4: Members inherited from a superclass and which are neither hidden nor overridden maintain the annotations they had in the class that declared them, including member-level annotations implied by class-level annotations. Rule 4 is exemplified in the following code snippet:

```
@Foo(TAG1)
public class B {
    public void m1( ) { ... }
    @Foo(TAG2)
    public void m2( ) { ... }
    public void m3( ) { ... }
    public void m4( ) { ... }
}
@Foo(TAG3)
public class A extends B {
    public void m3( ) { ... }
    @Foo(TAG4)
    public void m4( ) { ...}
}
```

Class A methods m1 and m2 inherited from class B and are not overridden by class A. Therefore, according to Rule 4, when considering class A, methods m1 and m2 maintain the annotations they had in class B. Thus, the effective @Foo annotation for method m1 is @Foo(TAG1), and the effective @Foo annotation for method m2 is @Foo(TAG2).

Rule 5: Inherited member-level annotations on a hidden or overridden member are always ignored. Rule 5 is exemplified in the code snippet presented above with respect to Rule 4. According to Rule 5, the effective annotations for methods which are overridden by class A, such as methods m3 and m4, are the annotations the overridden methods have in class A. Thus, method m3 has @Foo(TAG3) as its effective annotation. The method m4 has @Foo(TAG4) as its effective annotation. Furthermore, the annotations that methods m3 and m4 had as members of class B are ignored.

Rule 6: For the case of interfaces extending other interfaces, wherein the interfaces rely on annotations on methods as markers, the following rule applies. Interface-level annotations affect the interface they annotate and all its members, including inherited members. In other words, interface-level annotations within a particular interface behave as if all the methods declared in interfaces extended by the particular interface had been declared by the particular interface. Rule 6 is exemplified in the following code snippet:

```
@Foo(THIS)
public interface I1 {
    public void ml( );
}
@Foo(THAT)
public interface I2 extends I1 {
    public void m2( );
}
```

Rule 6 states that interfaces behave differently than classes and members of classes. More specifically, for determining the effective annotation on members of an interface, it is as if all the members of the interface had been declared on the interface itself, rather than inherited from one or more extended interfaces. In the code snippet above, the effective annotation for both members m1 and m2 is @Foo(THAT).

It should be appreciated that the above-described rules for managing annotation inheritance are defined to be intuitive, developer-friendly, and solve technical issues that the previously mentioned preliminary approaches would encounter in real-world JAVA applications. It should be further appreciated that the above-described rules for managing annotation inheritance enables the developer to focus on the annotations themselves rather than on abstract language design issues. Therefore, the above-described rules provide a valuable starting point for specifications defining annotations. Additionally, those skilled in the art will appreciate that having a single standardized set of rules for all annotations in the JAVA platform will reduce the amount of mental effort required of developers with respect to managing annotation inheritance issues, thus enabling increased developer productivity.

FIG. 1 is an illustration showing a flowchart of a method for managing class-level annotation inheritance, in accordance with one embodiment of the present invention. The method of FIG. 1 implements Rule 1 and Rule 3 described above. The method includes an operation 101 for identifying a class-level annotation applied to modify a class within an object-oriented program, e.g., within JAVA source code. In an operation 103, the identified class-level annotation is associated with each member declared within the class. Therefore, the class-level annotation may serve as a shorthand for member-level annotations. It should be appreciated that a member declared within the class represents either a field or method declared within the class. The method further includes an operation 105 in which the identified class-level annotation is not associated with a member of the class that is inherited from a superclass. It should be understood that a member declared within a class does not refer to a member inherited from a superclass. Thus, class-level annotations do not affect a member of the class that was actually declared within a superclass, even if the member is neither hidden nor overridden in the class. Additionally, annotations present within an interface that is implemented by a class are not considered to be associated with the class or members of the class. Thus, an interface implemented by a class does not contribute annotations to the class itself or members of the class.

Figure 2A:
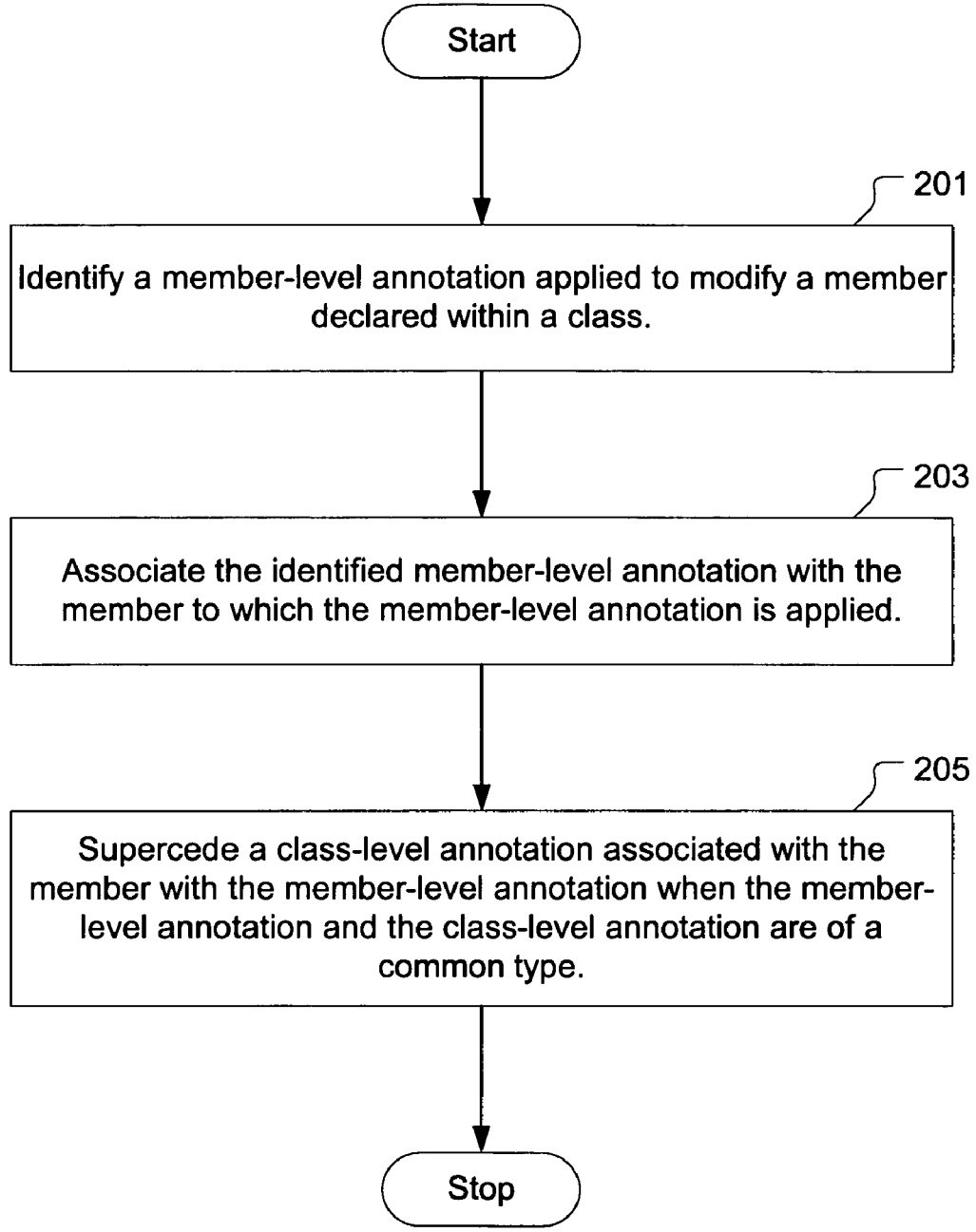
FIGS. 2A-2C are illustrations showing flowcharts of methods for managing member-level annotation inheritance, in accordance with one embodiment of the present invention.
Figure 2B:
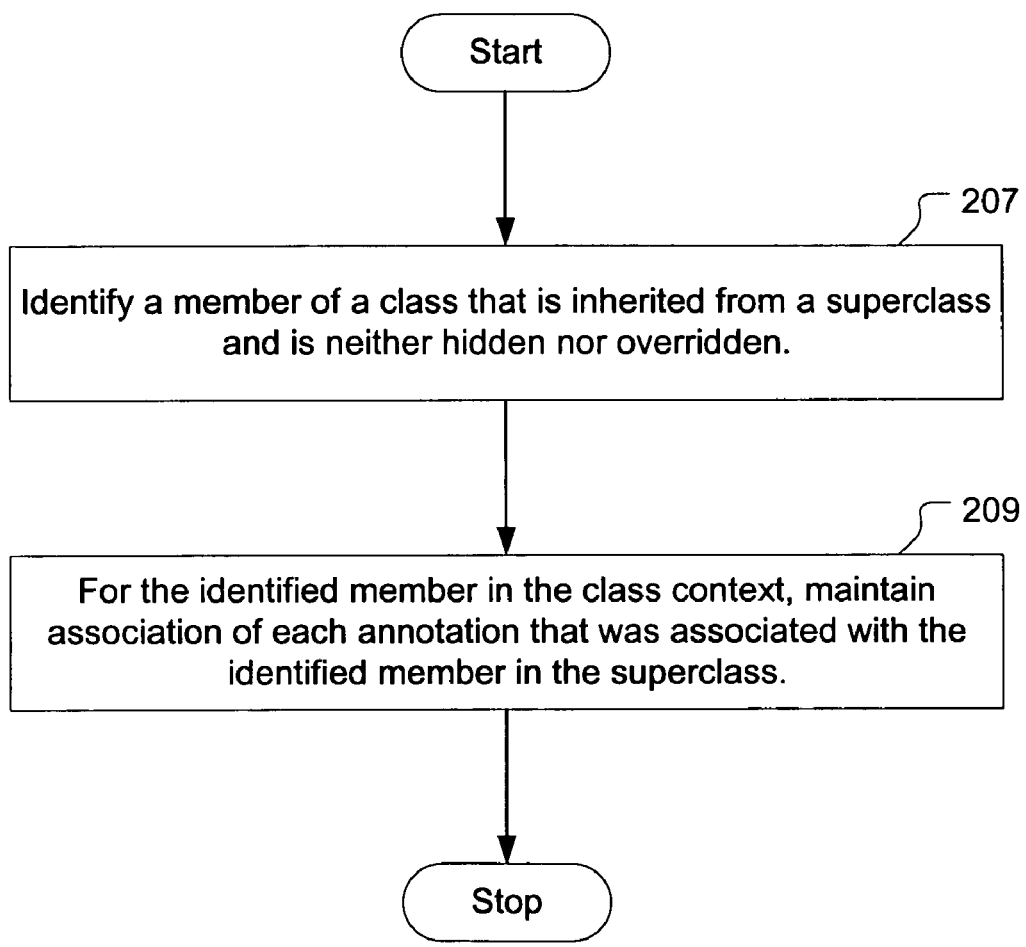
Figure 2C:
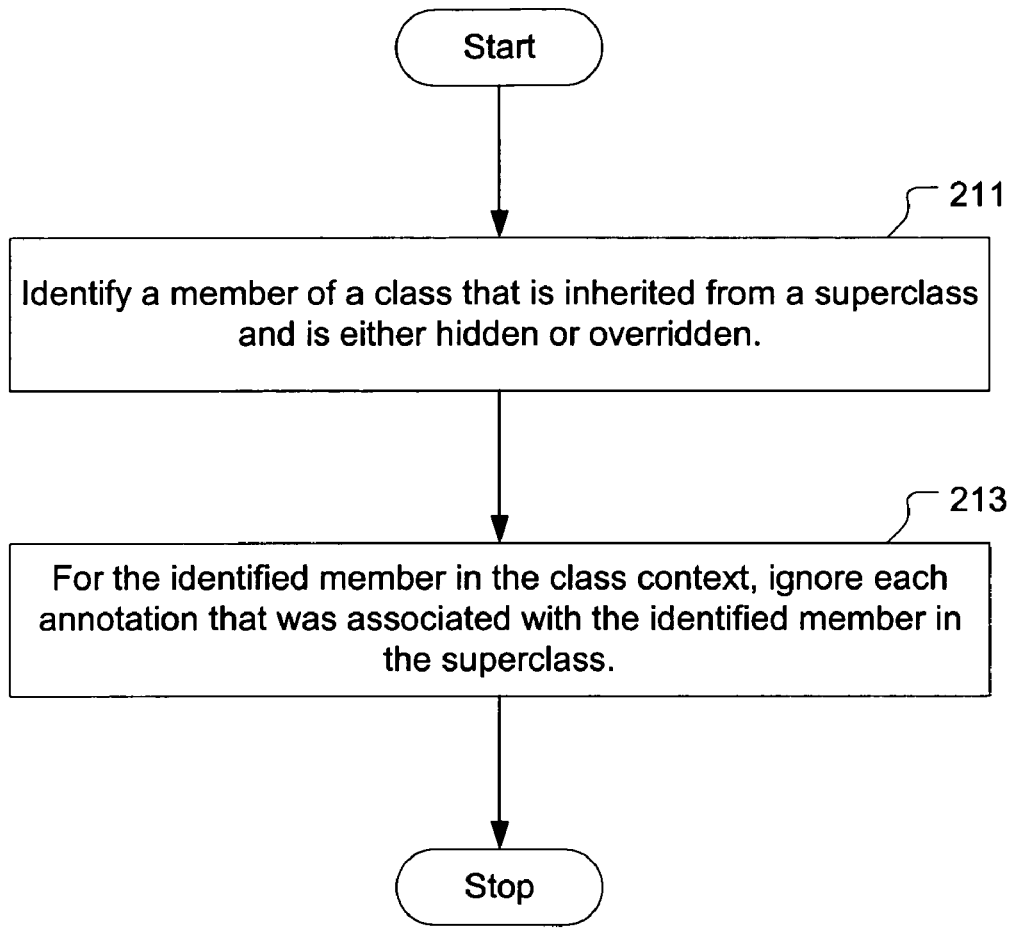

FIGS. 2A-2C are illustrations showing flowcharts of methods for managing member-level annotation inheritance, in accordance with one embodiment of the present invention. FIG. 2A implements Rule 2 described above. With respect to FIG. 2A, an operation 201 is provided to identify a member-level annotation applied to modify a member declared within a class. As previously mentioned, the member declared within the class can represent a field or method declared within the class. In an operation 203, the identified member-level annotation is associated with the member to which the member-level annotation is applied. According to an operation 205, if the member-level annotation and a class-level annotation are both associated with the member and are both of a common type, the member-level annotation supercedes the class-level annotation. Thus, explicit member-level annotations have priority over a member-level annotation that is implied by a class-level annotation.

FIG. 2B implements Rule 4 described above. With respect to FIG. 2B, an operation 207 is provided to identify a member of a class, wherein the identified member of the class is inherited from a superclass and is neither hidden nor overridden. For the inherited member identified in operation 207, an operation 209 is provided to maintain association of annotations that the inherited member had in the superclass in which it was declared. In other words, annotations associated with the inherited member (identified in operation 207) in the superclass are maintained within the context of the class within which the member is inherited. The annotations associated with the inherited member (identified in operation 207) in the superclass can include member-level annotations implied from a class-level annotation.

FIG. 2C implements Rule 5 described above. With respect to FIG. 2C, an operation 211 is provided to identify a member of a class, wherein the identified member of the class is inherited from a superclass and is either hidden or overridden. For the inherited member identified in operation 211, an operation 213 is provided to ignore each annotation that was associated with the inherited member in the context of the superclass from which the inherited member was inherited. In other words, inherited member-level annotations on a hidden or overridden member are ignored within the context of the class within which the member is inherited. The inherited member-level annotations that are to be ignored include both explicitly-defined member-level annotations and implicitly-defined member-level annotations that are inherited from the superclass.

Figure 3:
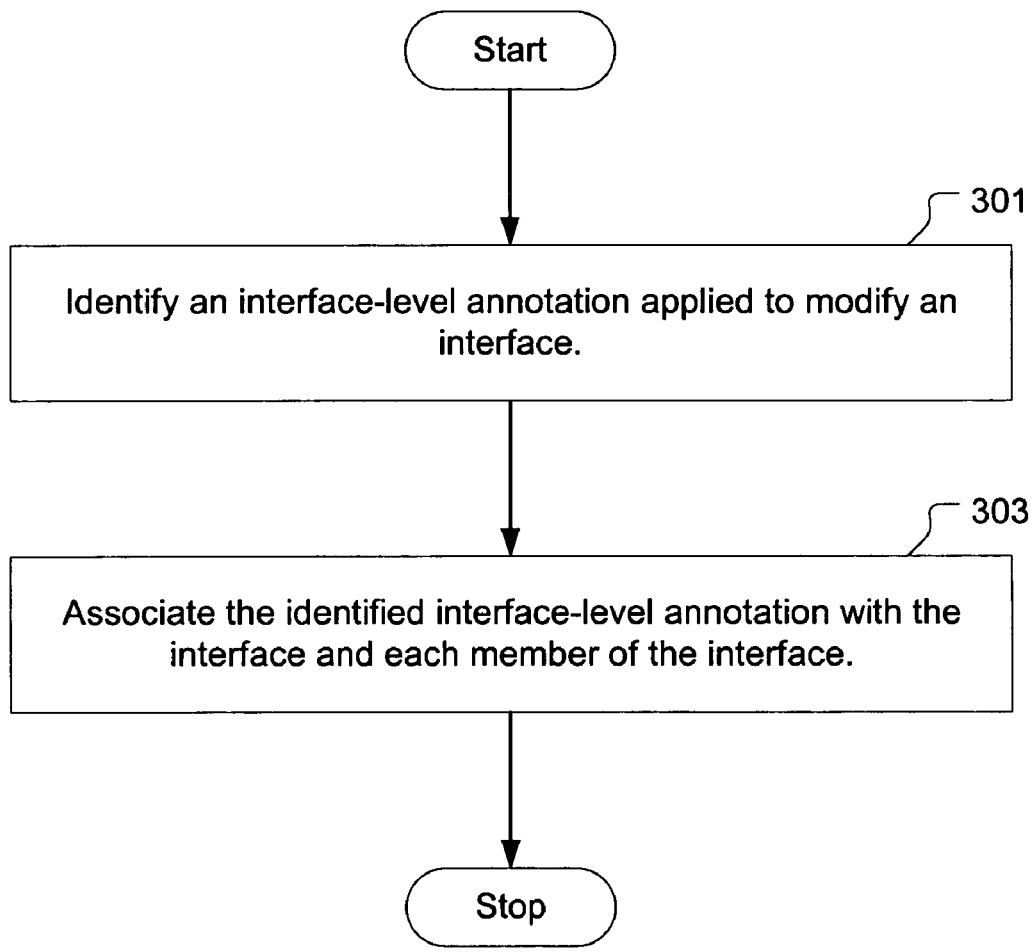
FIG. 3 is an illustration showing a flowchart of a method for managing interface-level annotation inheritance, in accordance with one embodiment of the present invention.

FIG. 3 is an illustration showing a flowchart of a method for managing interface-level annotation inheritance, in accordance with one embodiment of the present invention. The method of FIG. 3 implements Rule 6 described above. The method includes an operation 301 for identifying an interface-level annotation applied to modify an interface within an object-oriented program, e.g., within JAVA source code. In an operation 303, the identified interface-level annotation is associated with both the interface to which the interface-level annotation is applied and each member of interfaces that are extended by the interface to which the interface-level annotation is applied. Thus, interface-level annotations affect the interface they annotate and all its members, including inherited members. In other words, interface-level annotations within a particular interface behave as if all the methods declared in interfaces extended by the particular interface had been declared by the particular interface. The method of FIG. 3 is particular relevant to interfaces extending other interfaces, and relying on annotations on methods as markers.

Figure 4:
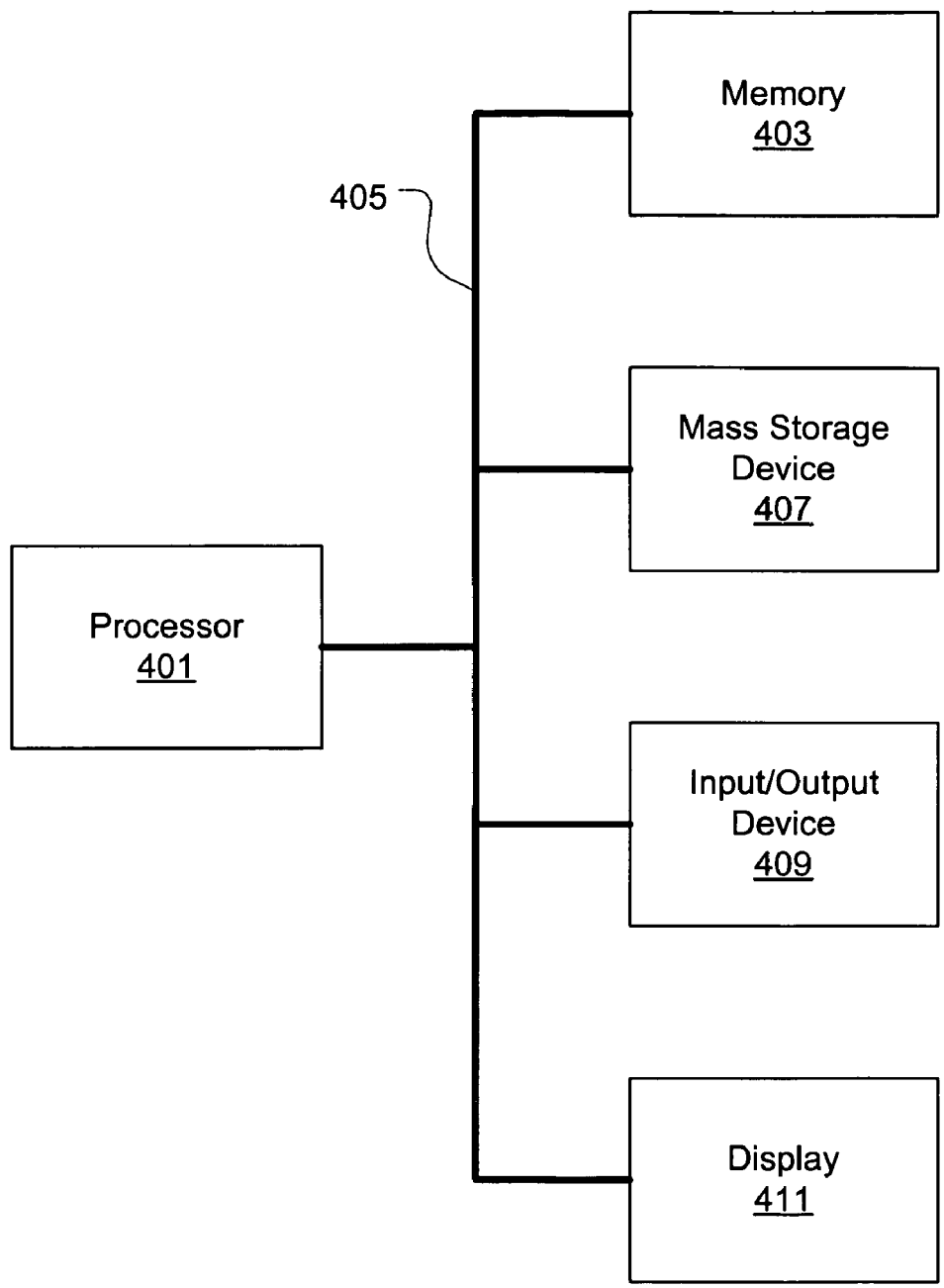
FIG. 4 is an illustration showing a exemplary computer system which may implement embodiments of the present invention.

It should be appreciated that the method for managing annotation inheritance in an object-oriented program as described herein may be performed with a digital processing system, such as a conventional, general-purpose computer system. Special purpose computers, which are designed or programmed to perform only one function may be used in the alternative. FIG. 4 is an illustration showing a exemplary computer system which may implement embodiments of the present invention. The computer system includes a processor 401, which is coupled through a bus 405 to a memory 403, mass storage device 407, an input/output device 409, and a display 411. Mass storage device 407 represents a persistent data storage device such as a floppy disc drive or a fixed disc drive, which may be local or remote. It should be appreciated that processor 401 may be embodied as a general-purpose processor, a special purpose processor, or a specially programmed logic device.

Input/output device 409 is coupled to bus 405 in order to communicate information in command selections to processor 401. It should be appreciated that data to and from external devices may be communicated through the input/output device 409. Processor 401 is defined to execute instructions encoded on a computer readable medium, such as the memory 403 or the mass storage device 407, for implementing the method for managing annotation inheritance in an object-oriented program as described herein. Additionally, processor 401 is defined to execute instructions encoded on a computer readable medium for providing a graphical user interface (GUI) to develop an object-oriented program, e.g., JAVA program, wherein the GUI is defined to visually communicate annotation properties associated with the object-oriented program.

Figure 5:
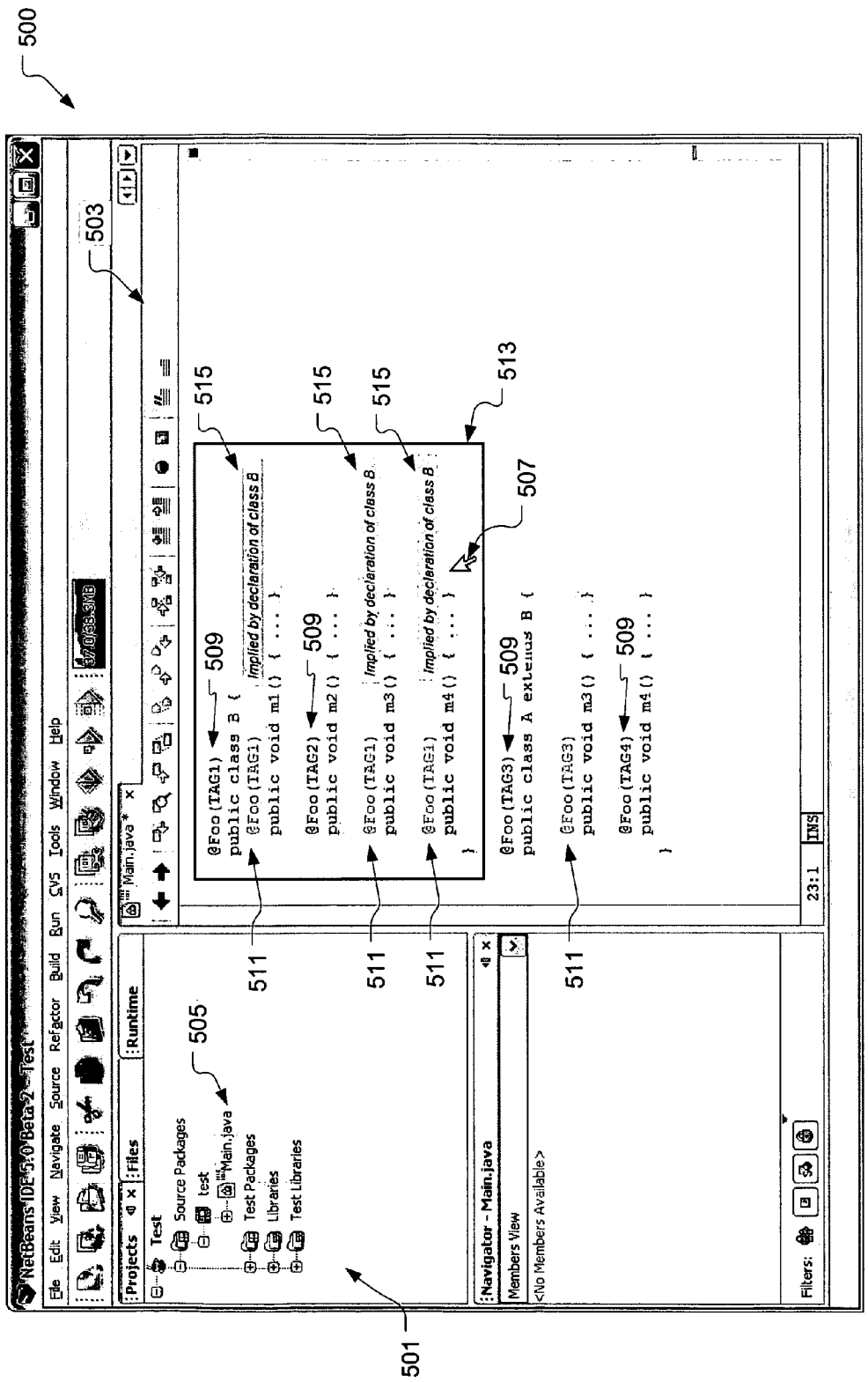
FIG. 5 is an illustration showing an example GUI for developing an object-oriented program, in accordance with one embodiment of the present invention.

FIG. 5 is an illustration showing an example GUI 500 for developing an object-oriented program, in accordance with one embodiment of the present invention. The GUI 500 represents an application developer's workbench. The GUI 500 includes a file browser frame 501 and a file editor frame 503. The file browser frame 501 enables a developer to browse through a file system hierarchy to locate and select a file to be opened for viewing/editing in the file editor frame 503. For example, FIG. 5 shows that a JAVA source code file "Main.java" 505 has been navigated to and selected by a developer. Once selected by the developer for viewing/editing, the contents of the "Main.java" file 505 is displayed in the file editor frame 503, as shown in FIG. 5. Through the use of an input device, such as a mouse 507, the developer can navigate through, select portions of, and modify the contents of the "Main.java" file 505 in the file editor frame 503.

The display and functionality of the GUI 500 is enabled through execution of program instructions by the processor 401, wherein the program instructions are encoded on a computer readable medium accessible to and readable by the processor 401, such as the memory 403 or the mass storage device 407. The program instructions for the GUI 500 include program instructions for rendering object-oriented program source code in a text form in a display. For example, program instructions are provided for rendering the textual contents of the "Main.java" file 505 in the displayed file editor frame 503. The GUI 500 functionality is further defined by program instructions for determining which annotations are associated with classes and class members within the object-oriented source code displayed in the file editor frame 503, according to the method for managing annotation inheritance as previously described with respect to Rules 1-6 and FIGS. 1-3.

The GUI 500 functionality is further defined by program instructions for rendering explicit annotation associations in a text form consistent with rendering of non-annotation source code. For example, in the source code of "Main.java" 505 as displayed in the file editor frame 503, explicit annotation associations 509 are rendered in a textual form consistent with the non-annotation source code. The GUI 500 functionality is also defined by program instructions for rendering implicit annotation associations in a modified text form different from the text form used to render non-annotation source code. For example, in the source code of "Main.java" 505 as displayed in the file editor frame 503, implicit annotation associations 511 are rendered in a textual form different from the non-annotation source code. More specifically, the implicit annotation associations 511 are rendered in a grayed out text form. It should be appreciated that implicit annotation associations represent either member-level annotation associations implied from class-level annotation associations or inherited annotation associations.

The GUI 500 functionality is further defined by program instructions for identifying a section of source code selected by the developer. The section of source code can be selected by the developer using essentially any available input means. For example, the cursor 507 can be positioned by the developer to hover over a section of source code to be selected. In one embodiment, the selected section of source code is visually identified to the developer by rendering a frame 513 around the selected section of source code. The GUI 500 functionality is further defined by program instructions for rendering a text description 515 of an origin of each implicit annotation association in the selected section of source code. The origin of a particular implicit annotation association corresponds to either a class or a class member to which the particular implicit annotation association is first explicitly associated.

It should be appreciated that by applying the method for managing annotation inheritance as previously described with respect to Rules 1-6 and FIGS. 1-3, the GUI 500 is capable of accurately visualizing to the developer which annotations apply to each class and class member. Thus, the GUI 500 relieves the developer from having to exhaust mental resources on managing and tracking annotation inheritance through complex object-oriented source code.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer readable storage medium having instructions encoded thereon for implementing a method for managing annotation inheritance in an object-oriented program, comprising:
    (a) identifying a class-level annotation applied to modify a class;
    (b) associating the identified class-level annotation with each member declared within the class;
    (c) identifying a member-level annotation applied to modify a first member declared within the class, wherein the first member is not inherited from any superclass of the class;
    (d) associating the identified member-level annotation with the first member to which the member-level annotation is applied, wherein the member-level annotation supersedes the class-level annotation associated with the first member when the member-level annotation and the class-level annotation are of a common type;
    (e) identifying a second member of the class that is inherited from any given superclass, the second member being neither hidden nor overridden; and
    (f) in the class, maintaining association of one or more annotations having been associated with the second member in its superclass,
    wherein implementation of the method includes either performing operations (a), (b), (c), and (d) without performing operations (e) and (f), or includes performing operations (a), (b), (c), (d), (e), and (f).

2. A computer readable storage medium encoded with computer executable instructions for managing annotation inheritance in an object-oriented program as recited in claim 1, wherein the one or more annotations having been associated with the second member in its superclass originate from a second class-level annotation applied to modify its superclass.

3. A computer readable storage medium encoded with computer executable instructions for managing annotation inheritance in an object-oriented program as recited in claim 1, further comprising:
    (g) identifying a third member of the class that is inherited from any given superclass, the third member being either hidden or overridden within the class; and
    (h) in the class, ignoring all annotations inherited by the third member from its superclass,
    wherein implementation of the method includes either performing operations (a), (b), (c), and (d) without performing operations (e), (f) (g), and (h), or includes performing operations (a), (b), (c), (d), (e), and (f) without performing operations (g) and (h), or includes performing operations (a), (b), (c), (d), (g), and (h) without performing operations (e) and (f), or includes performing operations (a), (b), (c), (d), (e), (f), (g), and (h).

4. A computer readable storage medium encoded with computer executable instructions for managing annotation inheritance in an object-oriented program as recited in claim 1, wherein the class-level annotation applied to modify the class is not associated with an inherited member of the class.

5. A computer readable storage medium encoded with computer executable instructions for managing annotation inheritance in an object-oriented program as recited in claim 1, wherein associating the identified class-level annotation with each member declared within the class enables the class-level annotation to serve as a shorthand for member-level annotations.

6. A computer readable storage medium encoded with computer executable instructions for managing annotation inheritance in an object-oriented program as recited in claim 1, wherein an interface implemented by the class can not contribute an annotation to be associated with the class or a member of the class.

7. A computer readable storage medium encoded with computer executable instructions for managing annotation inheritance in an object-oriented program as recited in claim 1, further comprising:
 identifying an interface-level annotation applied to modify a first interface; and
 associating the identified interface-level annotation with the first interface and each member of the first interface, wherein each member of the first interface can be declared within the first interface or inherited from a second interface that is extended by the first interface.

8. A computer system for managing annotation inheritance in an object-oriented program, comprising:
 a bus;
 a memory;
 a display; and
 a processor in communication with the memory and the display through the bus, the processor operable to receive instructions which, when executed by the processor, cause the processor to perform a method including,
  (a) identifying a class-level annotation applied to modify a class;
  (b) associating the identified class-level annotation with each member declared within the class;
  (c) identifying a member-level annotation applied to modify a first member declared within the class, wherein the first member is not inherited from a superclass of the class;
  (d) associating the identified member-level annotation with the first member to which the member-level annotation is applied, wherein the member-level annotation supersedes the class-level annotation associated with the first member when the member-level annotation and the class-level annotation are of a common type;
  (e) identifying a second member of the class that is inherited from a superclass, the second member being neither hidden nor overridden; and
  (f) in the class, maintaining association of one or more annotations having been associated with the second member in the superclass,
  wherein implementation of the method includes either performing operations (a), (b), (c), and (d) without performing operations (e) and (f), or includes performing operations (a), (b), (c), (d), (e), and (f).

9. A computer system for managing annotation inheritance in an object-oriented program as recited in claim 8, wherein the one or more annotations having been associated with the second member in the superclass originate from a second class-level annotation applied to modify the superclass.

10. A computer system for managing annotation inheritance in an object-oriented program as recited in claim 8, wherein the method further includes,
 (g) identifying a third member of the class that is inherited from any given superclass, the third member being either hidden or overridden within the class; and
 (h) in the class, ignoring all annotations inherited by the third member from its superclass,
 wherein implementation of the method includes either performing operations (a), (b), (c), and (d) without performing operations (e), (f) (g), and (h), or includes performing operations (a), (b), (c), (d), (e), and (f) without performing operations (g) and (h), or includes performing operations (a), (b), (c), (d), (g), and (h) without performing operations (e) and (f), or includes performing operations (a), (b), (c), (d), (e), (f), (g), and (h).

11. A computer system for managing annotation inheritance in an object-oriented program as recited in claim 8, wherein the class-level annotation applied to modify the class is not associated with an inherited member of the class.

12. A computer system for managing annotation inheritance in an object-oriented program as recited in claim 8, wherein associating the identified class-level annotation with each member declared within the class enables the class-level annotation to serve as a shorthand for member-level annotations.

13. A computer system for managing annotation inheritance in an object-oriented program as recited in claim 8, wherein an interface implemented by the class can not contribute an annotation to be associated with the class or a member of the class.

14. A computer system for managing annotation inheritance in an object-oriented program as recited in claim 8, wherein the method further includes,
 identifying an interface-level annotation applied to modify a first interface; and
 associating the identified interface-level annotation with the first interface and each member of the first interface, wherein each member of the first interface can be declared within the first interface or inherited from a second interface that is extended by the first interface.

15. A computer readable storage medium having instructions encoded thereon for providing a graphical user interface (GUI) for developing an object-oriented program, comprising:
 program instructions for rendering object-oriented program source code in a text form in a display;
 program instructions for determining which annotations are associated with classes and class members within the source code according to a method for managing annotation inheritance;
 program instructions for rendering explicit annotation associations in a text form consistent with rendering of non-annotation source code; and
 program instructions for rendering implicit annotation associations in a modified text form different from the text form used to render non-annotation source code,
 wherein the method for managing annotation inheritance includes,
  (a) identifying a class-level annotation applied to modify a class,
  (b) associating the identified class-level annotation with each member declared within the class,
  (c) identifying a member-level annotation applied to modify a first member declared within the class, wherein the first member is not inherited from a superclass of the class, and
  (d) associating the identified member-level annotation with the first member to which the member-level annotation is applied, wherein the member-level annotation supersedes the class-level annotation associated with the first member when the member-level annotation and the class-level annotation are of a common type, (e) identifying a second member of the class that is inherited from any given superclass, the second member being neither hidden nor overridden, and (f) in the class, maintaining association of one or more annotations having been associated with the second member in its superclass, wherein implementation of the method includes either performing operations (a), (b), (c), and (d) without performing operations (e) and (f), or includes performing operations (a), (b), (c), (d), (e), and (f).

16. A computer readable storage medium having instructions encoded thereon for providing a GUI for developing an object-oriented program as recited in claim 15, further comprising:

program instructions for identifying a section of selected source code; and program instructions for rendering a text description of an origin of each implicit annotation association in the section of selected source code, wherein the origin of a particular implicit annotation association corresponds to either a class or a class member to which the particular implicit annotation association is first explicitly associated.

17. A computer readable storage medium having instructions encoded thereon for providing a GUI for developing an object-oriented program as recited in claim 15, wherein the method for managing annotation inheritance includes, (g) identifying a third member of the class that is inherited from any given superclass, the third member being either hidden or overridden; and (h) in the class, ignoring all annotations inherited by the third member from its superclass, wherein implementation of the method includes either performing operations (a), (b), (c), and (d) without performing operations (e), (f) (g), and (h), or includes performing operations (a), (b), (c), (d), (e), and (f) without performing operations (g) and (h), or includes performing operations (a), (b), (c), (d), (g), and (h) without performing operations (e) and (f), or includes performing operations (a), (b), (c), (d), (e), (f), (g), and (h).

18. A computer readable storage medium having instructions encoded thereon for providing a GUI for developing an object-oriented program as recited in claim 17, wherein an interface implemented by the class can not contribute an annotation to be associated with the class or a member of the class.

* * * * *